US009456097B2

(12) United States Patent
Jo et al.

(10) Patent No.: US 9,456,097 B2
(45) Date of Patent: *Sep. 27, 2016

(54) IMAGE FORMING APPARATUS

(71) Applicant: SAMSUNG ELECTRONICS CO., LTD., Suwon-si, Gyeonggi-do (KR)

(72) Inventors: Yong Kon Jo, Suwon (KR); Myoung Jin Kim, Incheon (KR); Heung Kyu Jang, Suwon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,974

(22) Filed: Apr. 14, 2016

(65) Prior Publication Data

US 2016/0227058 A1     Aug. 4, 2016

Related U.S. Application Data

(63) Continuation of application No. 14/885,283, filed on Oct. 16, 2015, which is a continuation of application No. 12/109,626, filed on Apr. 25, 2008, now Pat. No. 9,197,774.

(30) Foreign Application Priority Data

Jun. 15, 2007  (KR) .......................... 10-2007-58953

(51) Int. Cl.
G03G 15/00   (2006.01)
H04N 1/00    (2006.01)
(52) U.S. Cl.
CPC .......... *H04N 1/00519* (2013.01); *G03G 15/00* (2013.01); *H04N 1/00554* (2013.01);
(Continued)

(58) Field of Classification Search
CPC ................. H04N 1/00554; G03G 2221/1654
See application file for complete search history.

(56) References Cited

U.S. PATENT DOCUMENTS 4,705,384 A   11/1987 Mizutani et al.
6,510,301 B2   1/2003 Tanaka
(Continued)

FOREIGN PATENT DOCUMENTS

JP    2002031862    1/2002
JP     200642003    2/2006
KR   1020060105283  10/2006

OTHER PUBLICATIONS

Chinese Office Action issued on Jan. 22, 2010 in corresponding Chinese Application No. 2008101258532.

(Continued)

*Primary Examiner* — Daniel J Colilla
*Assistant Examiner* — Ruben Parco
(74) *Attorney, Agent, or Firm* — Staas & Halsey LLP

(57) ABSTRACT

A printing apparatus and an image forming apparatus are provided. The printing apparatus includes a printing unit to form an image on a printing medium, a scanning unit pivotally coupled to the printing unit, and a cover unit pivotally coupled to the scanning unit and having a pressing portion. The printing apparatus includes a first member rotatably mounted to the scanning unit to latch the scanning unit to the printing unit when the cover unit is in an open state with respect to the scanning unit, and a second member mounted to the scanning unit to rotate the first member to unlatch the scanning unit from the printing unit when pressed by the pressing portion of the cover unit moving from the open state to a closed state with respect to the scanning unit.

26 Claims, 8 Drawing Sheets

(52) U.S. Cl.
CPC ......... *G03G2221/1654* (2013.01); *H04N 1/00* (2013.01); *H04N 2201/0091* (2013.01); *H04N 2201/0094* (2013.01)

(56) References Cited

U.S. PATENT DOCUMENTS

| | | | |
|---|---|---|---|
| 8,610,910 | B2 | 12/2013 | Nishikawa |
| 2004/0228650 | A1 | 11/2004 | Saito |
| 2005/0094218 | A1 | 5/2005 | Ando |
| 2006/0222435 | A1* | 10/2006 | Ha .................... H04N 1/00519 400/691 |
| 2007/0047028 | A1 | 3/2007 | Hashimoto et al. |
| 2007/0195381 | A1 | 8/2007 | Yamazaki et al. |

OTHER PUBLICATIONS

U.S. Restriction Requirement mailed Apr. 12, 2011 in U.S. Appl. No. 12/109,626 (Now U.S. Pat. No. 9,197,774).

U.S. Office Action mailed Jun. 28, 2011 in U.S. Appl. No. 12/109,626 (Now U.S. Pat. No. 9,197,774).

U.S. Office Action mailed Jan. 18, 2012 in U.S. Appl. No. 12/109,626 (Now U.S. Pat. No. 9,197,774).

U.S. Applicant-Initiated Interview Summary mailed Jun. 11, 2012 in U.S. Appl. No. 12/109,626 (Now U.S. Pat. No. 9,197,774).

U.S. Final Office Action mailed Sep. 25, 2012 in U.S. Appl. No. 12/109,626 (Now U.S. Pat. No. 9,197,774).

U.S. Office Action mailed Mar. 26, 2013 in U.S. Appl. No. 12/109,626 (Now U.S. Pat. No. 9,197,774).

U.S. Applicant-Initiated Interview Summary mailed May 7, 2013 in U.S. Appl. No. 12/109,626 (Now U.S. Pat. No. 9,197,774).

U.S. Final Office Action mailed Jul. 31, 2013 in U.S. Appl. No. 12/109,626 (Now U.S. Pat. No. 9,197,774).

U.S. Advisory Action mailed Dec. 17, 2013 in U.S. Appl. No. 12/109,626 (Now U.S. Pat. No. 9,197,774).

U.S. Office Action mailed Feb. 25, 2014 in U.S. Appl. No. 12/109,626 (Now U.S. Pat. No. 9,197,774).

U.S. Applicant-Initiated Interview Summary mailed Jun. 10, 2014 in U.S. Appl. No. 12/109,626 (Now U.S. Pat. No. 9,197,774).

U.S. Final Office Action mailed Jul. 23, 2014 in U.S. Appl. No. 12/109,626 (Now U.S. Pat. No. 9,197,774).

U.S. Advisory Action mailed Sep. 17, 2014 in U.S. Appl. No. 12/109,626 (Now U.S. Pat. No. 9,197,774).

U.S. Office Action mailed Dec. 15, 2014 in U.S. Appl. No. 12/109,626 (Now U.S. Pat. No. 9,197,774).

U.S. Notice of Allowance mailed May 13, 2015 in U.S. Appl. No. 12/109,626 (Now U.S. Pat. No. 9,197,774).

U.S. Office Action mailed Sep. 15, 2015 in U.S. Appl. No. 12/109,626 (Now U.S. Pat. No. 9,197,774).

U.S. Notice of Allowance mailed Oct. 6, 2015 in U.S. Appl. No. 12/109,626 (Now U.S. Pat. No. 9,197,774).

U.S. Notice of Allowance mailed Nov. 18, 2016 in co-pending U.S. Appl. No. 14/885,283.

U.S. Notice of Allowance mailed Mar. 1, 2016 in co-pending U.S. Appl. No. 14/885,283.

U.S. Appl. No. 14/885,283, filed Oct. 16, 2015, Yong Kon Jo et al., Samsung Electronics Co., Ltd.

* cited by examiner

IMAGE FORMING APPARATUS

CROSS-REFERENCE TO RELATED APPLICATIONS

This is a continuation application of U.S. patent application Ser. No. 14/885,283 filed on Oct. 16, 2015, which is a continuation application of U.S. patent application Ser. No. 12/109,626 filed on Apr. 25, 2008 and now patented as U.S. Pat. No. 9,197,774, and is related to and claims the priority benefit under 35 U.S.C. §119(a) of Korean Patent Application No. 10-2007-0058953, filed on Jun. 15, 2007 in the Korean Intellectual Property Office, the disclosures of which are incorporated herein by reference in their entirety.

BACKGROUND OF THE INVENTION

1. Field of the Invention

The present general inventive concept relates to an image forming apparatus, and more particularly, to an image forming apparatus having an automatic document feeding unit so as to successively read documents.

2. Description of the Related Art

An image forming apparatus is an apparatus that prints an image on a printing medium, e.g., paper, according to an input image signal. An image forming apparatus is classified as a printer, a copying machine, a multi-function printer which has multiple functions of printing, copying and scanning, and the like.

A conventional image forming apparatus includes an image reading unit to read image information recorded on a document, an image forming unit mounted under the image reading unit to form an image on a printing medium, e.g., paper, in response to image information read by the image reading unit or image information transferred from an external apparatus, e.g., a computer, and an automatic document feeding unit mounted above the image reading unit to enable the image reading unit to successively read documents.

The image reading unit is pivotally coupled to an upper portion of the image forming unit to enable a user to perform maintenance work on internal devices of the image forming unit. Accordingly, the image reading unit can be rotated to expose a top of the image forming unit as needed. The automatic document feeding unit is pivotally coupled to an upper portion of the image reading unit to enable the image reading unit to read a pile of documents or thick documents. Accordingly, the automatic document feeding unit can be rotated to expose a top of the image reading unit as needed.

However, in the above arrangement such that the image reading unit is pivotally coupled to the upper portion of the image forming unit and the automatic document feeding unit is pivotally coupled to the upper portion of the image reading unit, when exposing the top of the image forming unit by rotating the image reading unit to perform maintenance work on internal devices of the image forming unit, the automatic document feeding unit mounted above the image reading unit may unintentionally rotate by its own weight and collide with another object, for example, a wall of a building, against which the image forming apparatus is installed, thereby being damaged.

SUMMARY OF THE INVENTION

The present general inventive concept provides an image forming apparatus that is capable of preventing a top of an image forming unit and a top of an image reading unit from being simultaneously exposed.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including an image forming unit to form an image on a printing medium, an image reading unit pivotally coupled to an upper portion of the image forming unit to expose and shield a top of the image forming unit, an automatic document feeding unit pivotally coupled to an upper portion of the image reading unit to expose and shield a top of the image reading unit, and a locking device to selectively expose any one of the top of the image forming unit and the top of the image reading unit.

The locking device may include an up/down lever movably mounted on the image reading unit, and a first hook member rotatably mounted on the image reading unit, the first hook member rotating between a first position in which the first hook member is latched by the image forming unit and a second position in which the first hook member is released from the image forming unit by being pressed by the lever, where the automatic document feeding unit may be provided with a pressing protrusion to protrude downward to move the lever by pressing the lever.

The first hook member may include a force transmitting portion to receive a force from a lower end of the lever to cause rotation of the first hook member, and a first latching portion latched by the image forming unit depending on a rotational angle of the first hook member.

The locking device may include a first elastic member to move the lever away from the first hook member, and a second elastic member to return the first hook member to the first position.

The lever may be provided with a mounting recess at a lower end thereof to supportingly receive an upper end of the first elastic member, and the image reading unit may be provided with a supporting part disposed thereon to support a lower end of the second elastic member.

The mounting recess may have a lower portion opened sideward to permit the lower end of the lever to pass by the supporting part and to move downward.

The locking device may include a second hook member rotatably mounted in the image reading unit. When the top of the image forming unit is exposed, the second hook member may be latched by contact with the pressing protrusion.

The second hook member may be pivotally coupled to the image reading unit at a lower end thereof and may have a second latching portion at an upper end thereof, which is bent sideward to be latched by contact with the pressing protrusion, and the pressing protrusion may have a third latching portion at a lower end thereof, which is bent sideward to be latched to the second latching portion.

The foregoing and/or other aspects and utilities of the present general inventive concept may also be achieved by providing an image forming apparatus including an image forming unit to form an image on a printing medium, an image reading unit pivotally coupled to an upper portion of the image forming unit to expose and shield a top of the image forming unit, an automatic document feeding unit pivotally coupled to an upper portion of the image reading unit to expose and shield a top of the image reading unit, an up/down lever movably mounted on the image reading unit, and a locking device, where when the top of the image forming unit is exposed, the locking device fixedly attaches the automatic document feeding unit to the image reading unit, and when the top of the image reading unit is exposed, the locking device fixedly attaches the image reading unit to the image forming unit.

The locking device may include a first hook member rotatably mounted on the image reading unit, the first hook member to rotate between a first position in which the first hook member is latched by the image forming unit and a second position in which the first hook member is released from the image forming unit by being rotated by contact with the lever, a pressing protrusion to protrude downward from the automatic document feeding unit to move the lever by pressing the lever, and a second hook member rotatably mounted on the image reading unit, the second hook member being latched by contact of the pressing protrusion when the top of the image forming unit is exposed.

The foregoing and/or other aspects and utilities of the present general inventive concept may also be achieved by providing an image forming apparatus, including an image forming unit, an image reading unit movably disposed on the image forming unit, a document reading unit movably disposed on the image reading unit, and a locking device to selectively couple the image reading unit to one of the image forming unit and the document reading unit.

The locking device may include first and second latching members that are rotatably disposed on the image forming apparatus, and a sliding member to selectively fixedly attach the first latching member to the image forming unit and the second latching member to the automatic document reading unit.

When the first latching member is in a latched state the second latching member may be in an unlatched state.

When the first latching member is in an unlatched state the second latching member may be in a latched state.

The first and second latching members may be rotatably disposed on the image reading unit.

When a top of the image forming unit is exposed to outside of the image forming apparatus, the locking device fixedly attaches the image reading unit to the automatic document feeding unit.

When a top of the image reading unit is exposed to outside of the image forming apparatus, the locking device fixedly attaches the image reading unit to the image forming unit.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
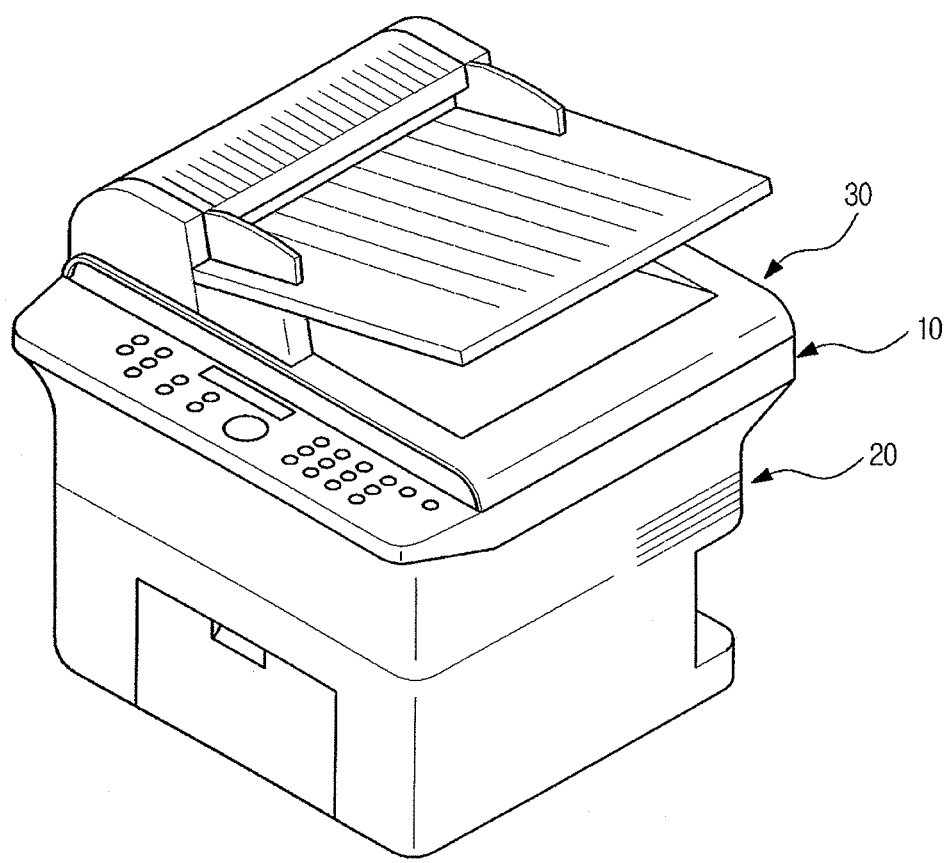
FIG. 1 is a perspective view illustrating an image forming apparatus in accordance with the present general inventive concept.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

As illustrated in FIG. 1, an image forming apparatus 5 according to the present general inventive concept includes an image reading unit 10 to read an image recorded on a document, an image forming unit 20 to print an image on a printing medium, e.g., printing paper, in response to image information read by the image reading unit 10 or image information transferred from an external apparatus, e.g., a computer, and an automatic document feeding unit 30 to automatically feed documents so that the image reading unit 10 can successively read the documents.

The image reading unit 10 is mounted above the image forming unit 20 for convenience in use, and the automatic document feeding unit 30 is mounted above the image reading unit 10 to enable the image reading unit 10 to successively read the documents. The image reading unit 10 is pivotally coupled to an upper portion of the image forming unit 20 at its rear end to enable a user to perform maintenance work on internal devices of the image forming unit 20. Accordingly, the image reading unit 10 can be rotated upward to expose a top portion of the image forming unit 20. The automatic document feeding unit 30 is pivotally coupled to an upper portion of the image reading unit 10 at its rear end to enable the image reading unit 10 to read a pile of documents, or thick documents, manually fed by a user, since the documents cannot be fed through the automatic document feeding unit 30. Accordingly, the automatic document feeding unit 30 can be rotated upward to expose a top of the image reading unit 10.

Figure 2:
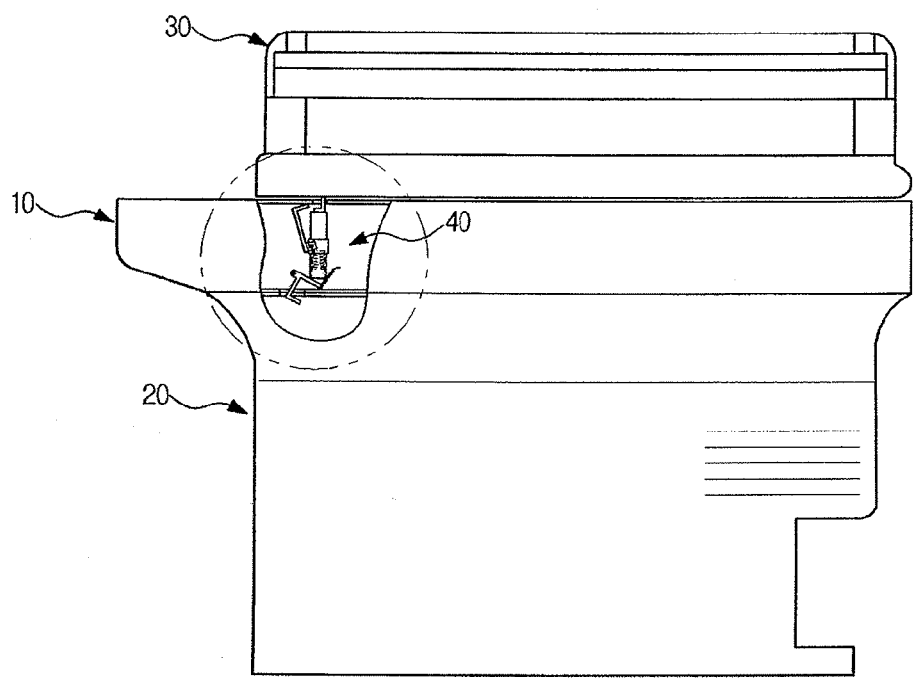
FIG. 2 is a perspective view illustrating a locking device of the image forming apparatus of FIG. 1 in accordance with the present general inventive concept.

As illustrated in FIG. 2, the image forming apparatus 5 according to the present general inventive concept may further include a locking device 40 to prevent the top of the image forming unit 20 and the top of the image reading unit 10 from being simultaneously exposed by selectively exposing any one of the top of the image forming unit 20 and the top of the image reading unit 10. Both of the top of the image reading unit 10 and the top of the image forming unit 20 may not be simultaneously exposed to the outside of the image forming apparatus 5. When the top of the image forming unit 20 is exposed, the locking device 40 fixedly attaches the automatic document feeding unit 30 to the image reading unit 10. On the other hand, when the top of the image reading unit 10 is exposed, the locking device 40 fixedly attaches the image reading unit 10 to the image forming unit 20. Accordingly, only any one of the top of the image forming unit 20 and the top of the image reading unit 10 is selectively exposed.

When the automatic document feeding unit 30 moves with respect to one of the image reading unit 10 and the image forming unit 20, the image reading unit 10 and the image forming unit 20 are coupled to each other so that the image reading unit 10 and the image forming unit 20 do not move with respect to each other. When the image reading unit 10 moves with respect to the image forming unit 20, the image reading unit 10 and the automatic document feeding unit 30 are coupled to each other so that the image reading unit 10 and the automatic document feeding unit 30 do not move with respect to each other.

Figure 3:
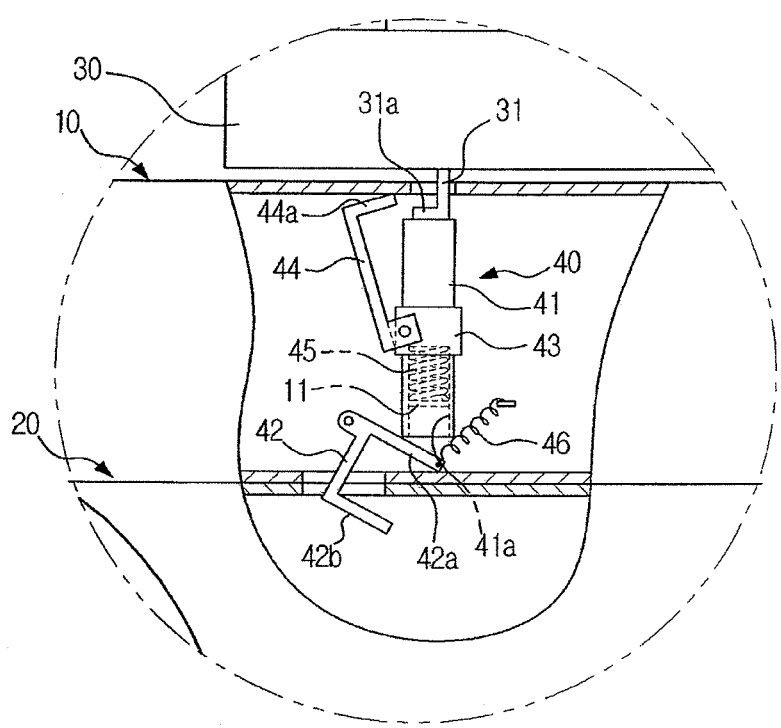
FIG. 3 is a side view illustrating a state in which both a top of an image forming unit and a top of an image reading unit are shielded in the image forming apparatus of FIG. 1 in accordance with the present general inventive concept.
Figure 4:
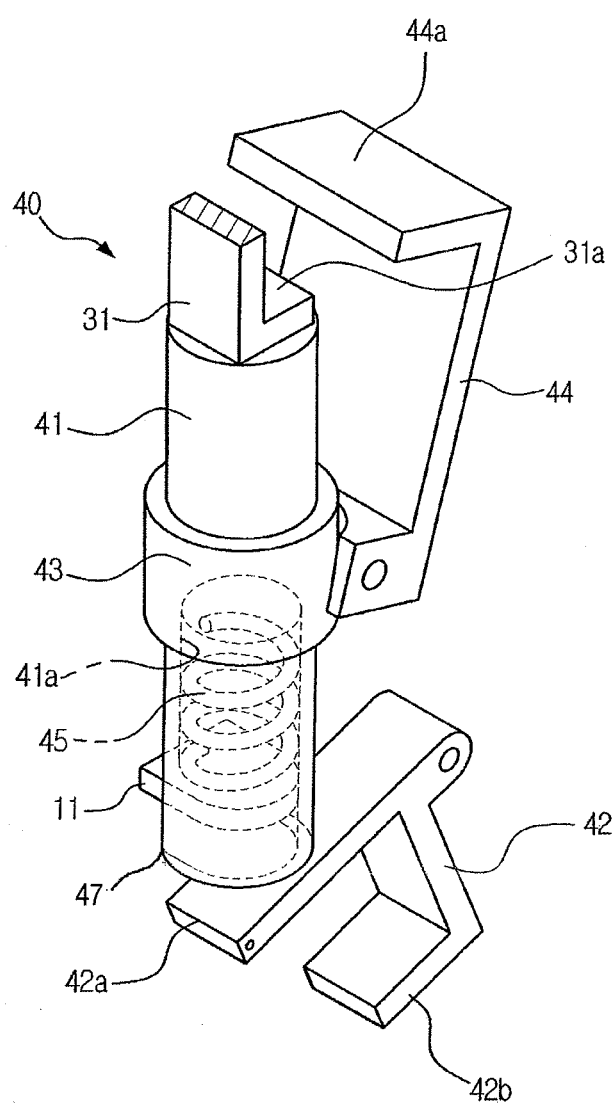
FIG. 4 is an enlarged view of a circular highlighted portion of FIG. 2.

As illustrated in FIGS. 3 and 4, the locking device 40 includes a lever 41 which is up/down movably mounted on the image reading unit 10, a first hook member 42 rotatably mounted on the image reading unit 10, and a guide member 43 to guide the up/down movement of the lever 41. The first hook member 42 rotates between a first position in which the first hook member 42 is latched by the image forming unit 20 and a second position in which the first hook member 42 is released from the image forming unit 20 by being pressed by the down-moving lever 41. The first hook member 42 includes a force transmitting portion 42a which receives a pressing force from a lower end 47 of the lever 41 to cause a downward rotation of the first hook member 42, and a first latching portion 42b which is latched by the image forming unit 20 depending on a rotational angle of the first hook member 42.

The automatic document feeding unit 30 is provided with a pressing protrusion 31 which protrudes downward. When the automatic document feeding unit 30 covers the top of the image reading unit 10, the pressing protrusion 31 presses downward on the lever 41 to move the lever 41 downward. The locking device 40 further includes a first elastic member 45, which may be a spring, for example, and may be disposed internally within the lever 41 in a mounting recess 41a, and a second elastic member 46, which may be a spring, for example, and may be attached to the force transmitting portion 42a of the first hook member 42. When the automatic document feeding unit 30 is rotated upward such that the top of the image reading unit 10 is exposed, the down pressing force of the pressing protrusion 31 on the lever 41 is removed, and an elastic force of the first elastic member 45 causes the first elastic member 45 to return the lever 41 upward. When the lever 41 is returned upward by the elastic force of the first elastic member 45, an elastic force of the second elastic member 46, which may be attached to the force transmitting portion 42a of the first hook member 42, causes the first hook member 42 to rotate upward to the first position, where the first hook member 42 is latched by the image forming unit 20 (referring to FIG. 6).

As described above, to install the first elastic member 45, the lever 41 may be provided with an internal mounting recess 41a to supportingly receive an upper end of the first elastic member 45, and a supporting part 11 to support a lower end of the first elastic member 45 may be protrudingly formed on a portion of the image reading unit 10. A lower portion of the mounting recess 41a may be opened sideward so that the supporting part 11 can be inserted into the mounting recess 41a. Accordingly, the lower end of the lever 41 can pass by the supporting part 11 and press down the force transmitting portion 42a of the first hook member 42 mounted below the supporting part 11.

The locking device 40 may further include a second hook member 44 rotatably mounted on a portion of the image reading unit 10. When the image reading unit 10 is rotated upward and the top of the image forming unit 20 is exposed, the second hook member 44 rotates toward the pressing protrusion 31 to be latched by the pressing protrusion 31 (referring to FIG. 8). The second hook member 44 may be pivotally coupled to a portion of the image reading unit 10 at its lower end. In order for the second hook member 44 to be latched by the pressing protrusion 31, the second hook member 44 has a second latching portion 44a at its upper end, which is bent sideward to be latched by the pressing protrusion 31. The pressing protrusion 31 has a third latching portion 31a disposed at its lower end, which is bent sideward to receive and to be latched by the second latching portion 44a of the second hook member 44.

Figure 5:
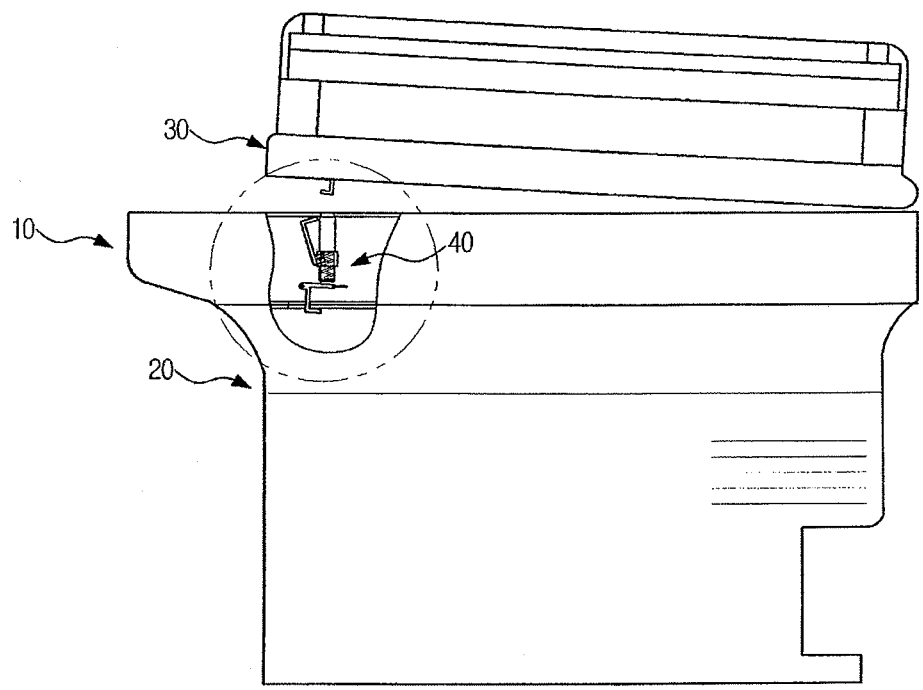
FIG. 5 is a side view illustrating a state in which the top of the image reading unit is exposed in the image forming apparatus of FIG. 1 in accordance with the present general inventive concept.
Figure 6:
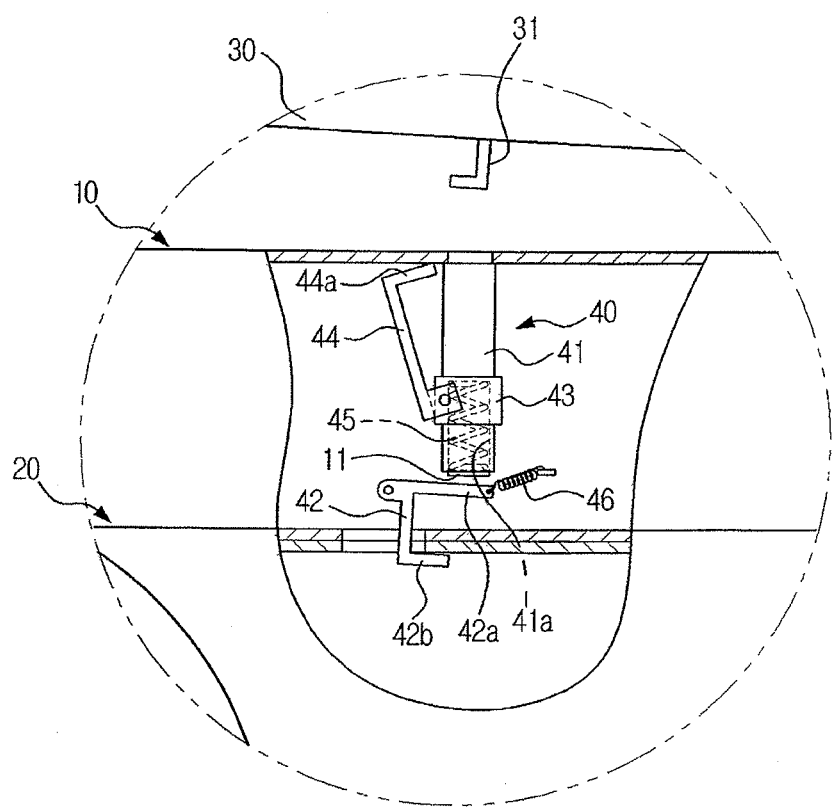
FIG. 6 is an enlarged view of a circular highlighted portion of FIG. 5.

Accordingly, while the top of the image reading unit 10 is unexposed and covered with the automatic document feeding unit 30, the lever 41 is kept in a state of being compressed and is moved down by the pressing protrusion 31, and the first hook member 42 is kept in a state of being rotated and released from the image forming unit 20, so that the top of the image forming unit 20 can be exposed by rotating the image reading unit 10. When the top of the image reading unit 10 is exposed by rotating the automatic document feeding unit 30 upward as illustrated in FIG. 5, the lever 41 is returned upward by an elastic force of the first elastic member 45 as illustrated in FIG. 6, the first hook member 42 is returned to its original position by being rotated upward by the second elastic member 46, and the first latching portion 42b of the first hook member 42 is latched by the image forming unit 20, thereby fixedly attaching the image reading unit 10 to the image forming unit 20. As described above, when the top of the image reading unit 10 is exposed, the locking device 40 according to the present general inventive concept fixedly attaches the image reading unit 10 to the image forming unit 20.

Figure 7:
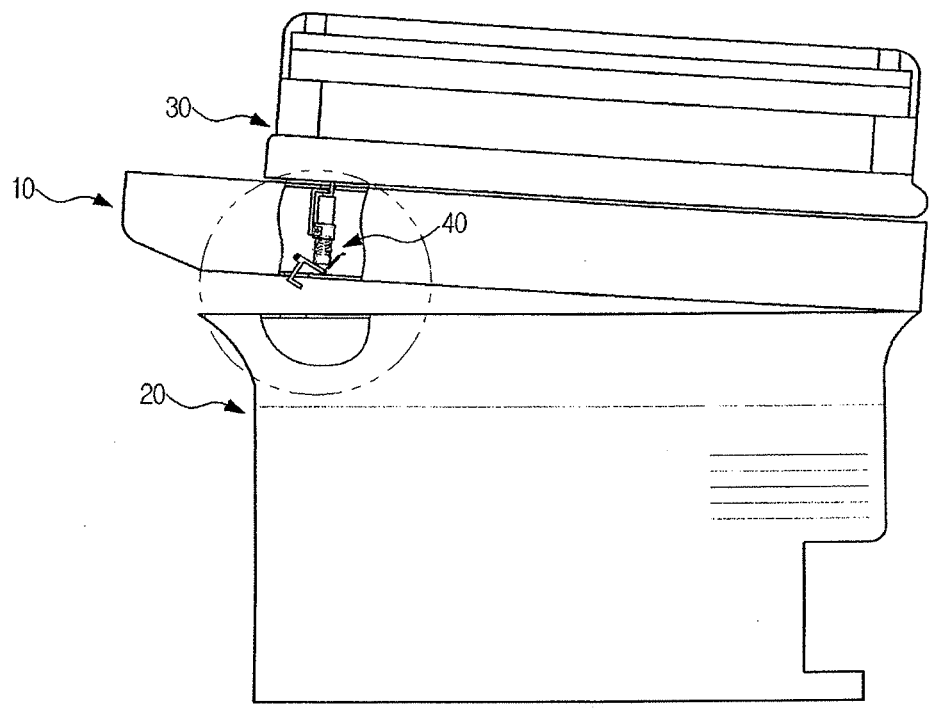
FIG. 7 is a side view illustrating a state in which the top of the image forming unit is exposed in the image forming apparatus of FIG. 1 in accordance with the present general inventive concept.
Figure 8:
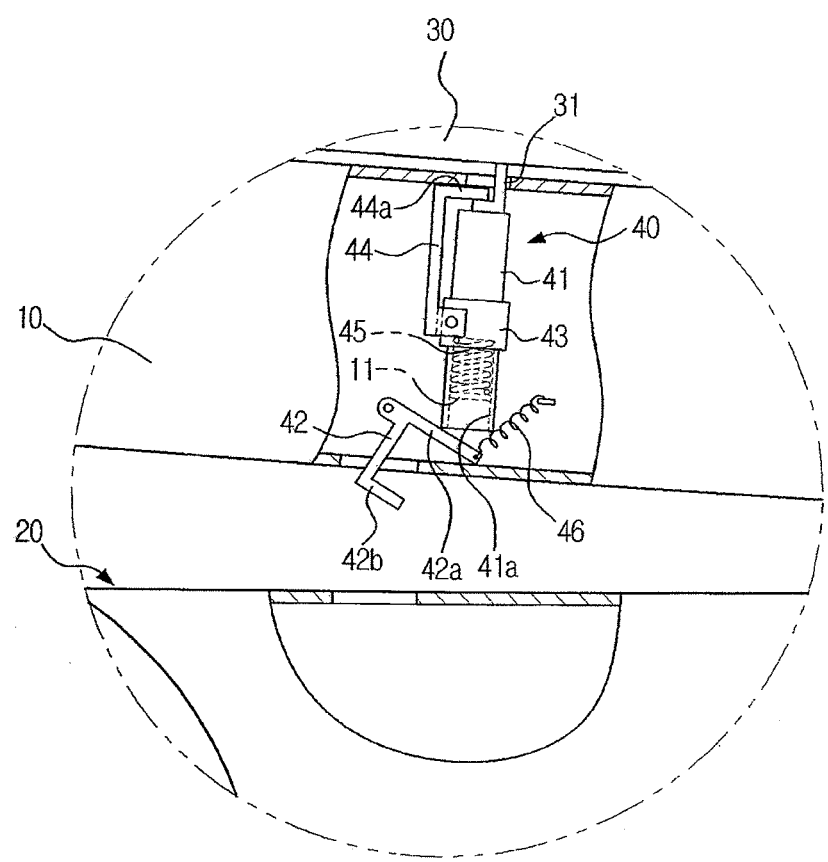
FIG. 8 is an enlarged view of a circular highlighted portion of FIG. 7.

If rotating the image reading unit 10 to expose the top of the image forming unit 20 as illustrated in FIG. 7, the second hook member 44 rotates on the lower end by its own weight as illustrated in FIG. 8, and the second latching portion 44a provided at the upper end of the second hook member 44 is latched by the third latching portion 31a of the pressing protrusion 31 introduced into the image reading unit 10, thereby fixedly attaching the automatic document feeding unit 30 to the image reading unit 10 through the action of the pressing protrusion 31. As described above, when the top of the image forming unit 20 is exposed, the locking device 40 according to the present general inventive concept fixedly attaches the automatic document feeding unit 30 to the image reading unit 10.

As apparent from the above description, the image forming apparatus according to the present general inventive concept, can prevent both the top of the image forming unit and the top of the image reading unit from being simultaneously exposed by the locking device, which is capable of selectively exposing any one of the top of the image forming unit and the top of the image reading unit. Accordingly, the automatic document feeding unit can be prevented from being damaged due to the simultaneous exposure of the top of the image forming unit and the top of the image reading unit.

Although embodiments of the present general inventive concept have been illustrated and described, it would be appreciated by those skilled in the art that changes may be made in these embodiments without departing from the principles and spirit of the general inventive concept, the scope of which is defined in the appended claims and their equivalents.

What is claimed is:
1. An apparatus comprising:
    a printing unit configured to form an image on a printing medium;
    a scanning unit pivotally coupled to the printing unit;

a cover unit pivotally coupled to the scanning unit, the cover unit having a pressing portion;

a first member rotatably mounted to the scanning unit, the first member configured to latch the scanning unit to the printing unit when the cover unit is in an open state with respect to the scanning unit; and a second member mounted to the scanning unit and configured to move linearly in a down direction with respect to the first member to rotate the first member by pressing the first member to unlatch the scanning unit from the printing unit when pressed by the pressing portion of the cover unit moving from the open state to a closed state with respect to the scanning unit.

2. The apparatus of claim 1, wherein, the second member is configured to move linearly in an up direction with respect to the first member when the cover unit is moved from the closed state to the open state, and the first member is biased to automatically rotate to a latched position when the cover unit is moved from the closed state to the open state.

3. The apparatus of claim 1, wherein, the second member is configured to move linearly in an up direction when the cover unit is moved from the closed state to the open state, and the first member includes a hook part and a spring part to automatically rotate the hook part to a latched position when the cover unit is moved from the closed state to the open state.

4. The apparatus of claim 1, further comprising a third member rotatably mounted to the scanning unit to latch the scanning unit to the cover unit when the scanning unit is in an open state with respect to the printing unit.

5. The apparatus of claim 4, wherein, the pressing portion includes a hook part, and the third member includes a hook part to latch the hook part of the pressing portion to latch the scanning unit to the cover unit.

6. The apparatus of claim 5, wherein the hook part of the third member latches the hook part of the pressing portion to latch the scanning unit to the cover unit based on a gravitational force exerted on the third member when the scanning unit is moved from a closed state to an open state with respect to the printing unit.

7. The apparatus of claim 1, wherein the first member includes:

a force transmitting portion to receive a force from a lower end of the second member to cause rotation of the first member, and a latching portion latched to the printing unit depending on a rotational angle of the first member.

8. An image forming apparatus, comprising:

an image forming unit which forms an image on a printing medium;

an image reading unit, pivotally coupled to the image forming unit, and including a first hook member rotatably mounted to the image reading unit, and a lever member mounted to the image reading unit and linearly movable in an up direction and a down direction with respect to the first hook member to press the first hook member; and a document feeding unit, pivotally coupled to the image reading unit, and including a pressing portion operable to move the lever member in the down direction to unlatch the image forming unit and the image reading unit from each other, and in the up direction to latch the image forming unit and the image reading unit to each other.

9. The image forming apparatus of claim 8, the image reading unit including a second hook member rotatably mounted to latch the image reading unit and the document feeding unit to each other.

10. The image forming apparatus of claim 9, wherein, the pressing portion includes a hook part, and the second hook member includes a hook part to latch the hook part of the pressing portion to latch the image reading unit and the document feeding unit to each other.

11. The image forming apparatus of claim 10, wherein the hook part of the second hook member latches the hook part of the pressing portion to latch the image reading unit and the document feeding unit to each other based on a gravitational force exerted on the second hook member when the image reading unit is moved from a closed state to an open state with respect to the image forming unit.

12. The image forming apparatus of claim 8, wherein the first hook member includes:

a force transmitting portion to receive a force from a lower end of the lever member to cause rotation of the first hook member; and a latching portion latched to the image forming unit depending on a rotational angle of the first hook member.

13. An image forming apparatus, comprising:

an image forming unit which forms an image on a printing medium;

an image reading unit pivotally coupled to the image forming unit;

a document feeding unit, pivotally coupled to the image reading unit, the document feeding unit having a pressing portion to move a sliding member by pressing the sliding member; and a locking device including:

the sliding member mounted to the image reading unit to move up and down linearly relative to the image reading unit; and a first latching member rotatably mounted to the image reading unit, the first latching member configured to latch the image forming unit by receiving a pushing force from the sliding member, wherein the document feeding unit rotating from an open position to a closed position with respect to the image reading unit causes the pressing portion to press the sliding member to rotate the first latching member so that the first latching member is unlatched from the image forming unit and the image reading unit is separable from the image forming unit.

14. The image forming apparatus of claim 13, the locking device including a second latching member rotatably mounted to the image reading unit to latch the image reading unit to the document feeding unit when the image reading unit is separated from the image forming unit.

15. The image forming apparatus of claim 14, wherein, the pressing portion includes a hook part, and the second latching member includes a hook part to latch the hook part of the pressing portion to latch the image reading unit to the document feeding unit.

16. The image forming apparatus of claim 15, wherein the hook part of the second latching member latches the hook part of the pressing portion to latch the image reading unit to the document feeding unit based on a gravitational force exerted on the second latching member when the image reading unit is separated from the image forming unit.

17. The image forming apparatus of claim 13, wherein the first latching member includes:

a force transmitting portion to receive a force from a lower end of the sliding member to cause rotation of the first latching member, and a latching portion latched to the image forming unit depending on a rotational angle of the first latching member.

18. The apparatus of claim 1, wherein the cover unit comprises a document feeding unit configured to feed documents so that the scanning unit can read the documents.

19. The image forming apparatus of claim 8, wherein the pressing portion is pressable to press the lever member to thereby linearly move the lever member in the down direction to unlatch the image forming unit and the image reading unit from each other.

20. The apparatus of claim 1, further comprising a guide member to guide downward movement of the second member.

21. The image forming apparatus of claim 8, further comprising a guide member to guide up/down movement of the lever member.

22. The image forming apparatus of claim 13, further comprising a guide member to guide up/down movement of the sliding member.

23. The image forming apparatus of claim 1, wherein the first member is configured to rotate about an axis substantially perpendicular to a movement direction of the second member.

24. The image forming apparatus of claim 1, wherein the first member is configured to rotate about an axis different from a movement path of the second member.

25. The image forming apparatus of claim 8, wherein the first hook member is configured to rotate about an axis substantially perpendicular to a movement direction of the lever member.

26. The image forming apparatus of claim 8, wherein the first hook member is configured to rotate about an axis different from a movement path of the lever member.

* * * * *